US005138221A

United States Patent [19]

Arato et al.

[11] Patent Number: 5,138,221

[45] Date of Patent: Aug. 11, 1992

[54] INORGANICALLY INSULATED HEATER, AND CATHODE RAY TUBE AND AIR FLOW SENSOR USING THE SAME

[75] Inventors: Toshiaki Arato, Katsuta; Toshiaki Narisawa, Hitachi; Masahisa Sobue, Mito; Nobuyuki Koganezawa, Mobara, all of Japan

[73] Assignee: Hitachi, Ltd., Tokyo, Japan

[21] Appl. No.: 545,649

[22] Filed: Jun. 28, 1990

[30] Foreign Application Priority Data

Jul. 1, 1989 [JP] Japan ................................ 1-170379

[51] Int. Cl.$^5$ ........................... H01J 1/16; H01J 1/24; G01F 1/68; H01C 1/32

[52] U.S. Cl. ................................ 313/446; 73/204.22; 219/544; 313/344; 313/345; 313/355; 338/264

[58] Field of Search ............... 313/446, 345, 344, 355, 313/356; 73/204.27, 204.22, 204.25; 219/544; 338/263, 264, 265, 266, 267, 268, 269, 260, 261, 262

[56] References Cited

U.S. PATENT DOCUMENTS

| | | | |
|---|---|---|---|
| 3,328,201 | 6/1967 | Scheible | 313/270 X |
| 3,500,686 | 3/1970 | Bell, III | 73/24.22 |
| 3,626,231 | 12/1971 | Kahl | 313/355 X |
| 3,691,421 | 9/1972 | Decker et al. | 313/345 |
| 4,554,480 | 11/1985 | Schlack | 313/446 |
| 4,909,079 | 3/1990 | Nishimura et al. | 338/263 X |

FOREIGN PATENT DOCUMENTS

| | | |
|---|---|---|
| 0001775 | 1/1944 | Japan . |
| 0006826 | 8/1959 | Japan . |
| 0095035 | 6/1969 | Japan . |
| 0132537 | 7/1984 | Japan . |
| 0221925 | 11/1985 | Japan . |
| 0121232 | 6/1986 | Japan . |
| 0142625 | 6/1986 | Japan . |
| 0055834 | 3/1987 | Japan . |
| 0739325 | 10/1955 | United Kingdom . |

OTHER PUBLICATIONS

Cathode/heater-insulation failure in oxide-cathode values; vol. 112; No. 8; Aug., 1965.

*Primary Examiner*—Donald J. Yusko
*Assistant Examiner*—Ashok Patel
*Attorney, Agent, or Firm*—Antonelli, Terry, Stout & Kraus

[57] ABSTRACT

The present invention relates to an inorganically insulated heater having a long life for use in air flow sensors, cathode ray tube cathode heaters etc., wherein the distribution of inorganic insulating particles of the whole insulating layer is made uniform and thereby the development of cracks and the like in the insulating layer is reduced and breaking of wire and dielectric breakdown occur with difficulty even at high temperatures and under strong vibrations.

22 Claims, 5 Drawing Sheets

INORGANICALLY INSULATED HEATER, AND CATHODE RAY TUBE AND AIR FLOW SENSOR USING THE SAME

BACKGROUND OF THE INVENTION

The present invention relates to an inorganically insulated heater. More particularly, it relates to an inorganically insulated heater improved in the inorganic insulating layer thereof, a process for production thereof, and the use thereof.

In cathode ray tubes and air flow sensors, there have been used inorganically insulated heaters provided with an insulating layer formed of a porous layer of an inorganic substance.

In particular, the cathode heating heater of a cathode ray tube generally comprises as shown in FIG. 1 a metallic wire coil 1, an insulating layer 2 and a dark layer 5, the metallic wire coil 1 being in the form of a double coil twisted toward the return bend end 1*a*.

The insulating layer 2 of said heater is formed of inorganic insulating particles comprising alumina ($Al_2O_3$) and the like as the main component. It is formed in close contact with the metallic wire surface.

The heater heats a cathode sleeve 3 formed cylindrically on the outside of the insulating layer 3, thereby heating a cathode pellet 4 attached to the end of the sleeve and making it emit thermoelectrons. The insulating layer 2 electrically insulates the cathode sleeve 3 from the metallic wire coil 1 [Japanese Patent Application Kokai (Laid-open) No. 57-95,035).

The dark layer 5 provided on the insulating layer 2 acts to enhance the heating efficiency [Japanese Patent Application Kokai (Laid-open) No. 59-132,537].

According to an experiment conducted by the present inventors it has been revealed that prior art cathode heating heaters give rise to imperfect insulation in a short period of time when the cathode pellet 4 is heated and operated at about 1100° C. or above.

The main reasons for this are as follows. As shown schematically in FIG. 2, during the firing of the insulating layer 2, voids 10 and cracks 9 that can reach the surface of the insulating layer develop in the insulating part 8 present between adjacent metallic wires of the metallic wire coil (whereas they do not develop in the insulating part 7 present on the metallic wire coil). Consequently, the strength of the insulating layer is lowered, and troubles are apt to occur owing to (1) breakage of the insulating part 8 present between metallic wires due to the thermal shock caused by on-off of electricity through the metallic wire coil, (2) short-circuit between adjacent metallic wires and burnout thereof due to the breakage of the insulating part 8, and (3) dielectric breakdown due to the presence of voids 10 developed in the insulating layer [caused by voltage (about 300 V) applied between the metallic wire coil and the cathode sleeve].

As the means for solving such problems, it has been proposed to mix fibrous or whisker-formed high melting point inorganic insulating material with the inorganic insulating particles thereby increasing the strength of the insulating layer and prevent the development of said cracks [Japanese Patent Application Kokoku (Post-Exam. Publn.) No. 44-1,775] or, conversely, to increase the porosity of the insulating layer thereby hindering the extension of the cracks [Japanese Patent Application Kokai (Laid-open) No. 60-221,925].

Further, methods have been proposed which comprise forming the metallic wire coil and the insulating layer not in a closely contacted state but with a clearance provided therebetween, thereby hindering the development of cracks due to thermal strain or difference in thermal expansion [Japanese Patent Application Kokai (Laid-open) Nos. 61-121,232 and 61-142,625].

It has been found that although the above-mentioned means for preventing the development or extension of cracks are all effective for heaters operated at relatively low temperatures (about 1,100° C. or below), they give only a short duration of life for heaters of the impregnation cathode heating system.

Insulating layers of the prior art have the following drawbacks.

(1) As shown in FIG. 2, it is difficult to prevent voids 10 or portions wherein the packing rate of the insulating particles is low (that is, non-uniform portions) from being formed between adjacent wires of metallic wire coil of the heater, so that the insulating layer is of low strength and is apt to undergo dielectric breakdown.

(2) Sintering of the inorganic insulating particles with each other proceeds during operation of the heater, causing contraction of the insulating layer, which results in development and progress of cracks, leading to dielectric breakdown in a short period of time.

(3) In the case of air flow sensors or such, though the working temperature is relatively low (about 200° C.), they are subjected to strong vibration because they are mounted on automobiles or the like, and hence the insulating layer is apt to develop cracks.

The cathode heating heater of the cathode ray tube of the prior art is generally prepared as follows. A primary coil is formed by winding W wire or Re-containing W wire as the metallic wire for the metallic wire coil. The primary coil is then wound in a specified dimension round a core of molybdenum (Mo) to form a double coil. Then $Al_2O_3$ particles are electrodeposition-coated thereon by means of electrophoresis and the like, and fired at 1600°–1700° C. to form an insulating layer composed of a porous layer of inorganic substance.

Then, according to intended purposes, either a dark layer comprising, for example, $Al_2O_3$ particles and tungsten (W) particles is attached onto said insulating layer and then fired, or a dark layer is formed on the unfired insulating layer and then the insulating layer and the dark layer are fired at the same time.

After firing, the Mo core is removed by dissolution with an acid to leave a space 6 as shown in FIG. 2, and the remaining system is washed with water and dried to give the intended heater.

When an insulating layer is formed by electrodeposition on the double coil-formed metallic wire as shown in FIG. 1, the inorganic insulating particles are adhered onto the metallic wire by electrophoresis through a suspension (i.e., liquid containing particles of $Al_2O_3$ etc. dispersed and suspended therein).

The driving force in said adhesion is attributed to a hydroxide gel formed by conversion of electrolytes, such as nitrates, dissolved in the suspension caused by electrolysis. However, although such gels are readily formed on the surface of metallic wire they are rather difficultly formed between the metal wires, so that voids are apt to develop in such places (Arato: Collected preliminary papers for 1987—spring meeting of Japan Inst. of Metals, p. 373).

This situation will be explained with reference to FIG. 2. Onto the insulating part 7 on the coil are adhered relatively small particles in the suspension relatively densely, while onto the insulating part 8 between adjacent metallic wires are adhered non-uniformly relatively large particles in the suspension.

Consequently, the insulating layer contracts between the metallic wire coils in the course of firing of the layer, resulting in development of cracks 9 or voids 10 [see FIG. 5 (*b*)].

Further, it has been revealed that, in the prior art heaters, contraction of the insulating layer caused by the progress of sintering of the layer which takes place during the operation of the heater, thermal shocks caused by thermo cycles, or repeated expansion and contraction of the metallic wire coil cause, in particular, breakage of the insulating part 8 of low strength present between metallic wires; and resultantly contact between metallic wires or metallic wire coils, breaking of wire of the heater, and dielectric breakdown of the insulating layer are apt to take place.

SUMMARY OF THE INVENTION

The object of the present invention is to provide an excellent inorganically insulated heater which develops no cracks etc. in the insulating layer even when used at a high temperature (e.g., 1,300° C.) or subjected to strong vibration, a method for production thereof, and the uses thereof, for example, air flow sensors, cathode heating heaters for cathode ray tubes, and cathode ray tube cathodes and cathode ray tubes provided with the heater.

The present invention is directed to an inorganically insulated heater comprising a metallic wire heater, an insulating layer covering said metallic wire heater formed of a porous layer of an inorganic substance and a covering layer formed on the insulating layer, wherein said insulating layer features:

(1) the first insulating layer formed in close contact with the metallic wire of the heater in which the packing rate of inorganic insulating particles between adjacent metallic wires of the metallic wire heater is 45–75% (as expressed in terms of the ratio to the sectional area of the insulating layer), and (2) the second insulating layer formed on the first insulating layer in which the packing rate of inorganic insulating particles is approximately equal to or higher than that of the first insulating layer, a process for production thereof, and the uses thereof.

Based on these features, an inorganically insulated heater can be provided in which development of cracks in the insulating layer is hindered and the dielectric breakdown caused by the cracks is prevented.

The packing rate of the first insulating layer is preferably 50–65%. The packing rate of the second insulating layer is preferably 45–85%, more preferably 60–75%.

Further, a cathode ray tube cathode and a cathode ray tube of a long life which use the heater can be provided.

The present invention is based on the finding that by selecting the packing rate of the insulating part 8 between adjacent metallic wires in the range of 45–75%, and by making the inorganic insulating particles distribute uniformly throughout the insulating layer, the development of cracks etc. in the insulating layer can be reduced, breaking of wire and dielectric breakdown of the heater can be suppressed, and thus the life of the heater can be improved.

DETAILED DESCRIPTION OF THE INVENTION

According to the present invention, the insulating layer is formed and divided in two portions, namely an insulating layer between adjacent metallic wires of the metallic wire coil (i.e., the first layer) and an insulating layer covering the outside of the first layer (i.e., the second layer).

The first and the second insulating layers can be formed by varying the composition of the suspension, containing the inorganic insulating particles dispersed and suspended therein, according to the respective layers to be formed.

The suspensions used in forming the first layer are those which contain an electrolyte capable of causing a reaction-control type electrodeposition on the metallic wire coil surface.

Examples of such electrolyte components are anhydrous aluminum nitrate [hereinafter expressed as $Al(NO_3)_3$] and aluminum sulfate [$Al_2(SO_4)_3$], and a mixture of anhydrous $Al(NO_3)_3$ with aluminum nitrate having crystallization water [hereinafter expressed as $Al(NO_3)_3.9H_2O$]. $AlCl_3$ as alone shows a diffusion-control type electrodeposition characteristic and cannot attain the object of the present invention, but it can form a reaction-control type electrodeposition liquid when 10–20 ml of formic acid (HCOOH) per 1 l of solvent is added to its solution.

Mixtures of an alcohol and water of a suitable ratio are used as the solvent for said electrolytes.

A preferred alcohol is ethanol. Polarizable organic solvents such as isopropanol may also be used.

The content of $Al(NO_3)_3$ is suitably 1.2–5 parts by weight relative to 100 parts by weight of said solvent.

The suspension is formed by dispersing and suspending 75–120 parts by weight of inorganic insulating particles in 100 parts by weight of the electrolyte solution mentioned above.

Figure 3A:
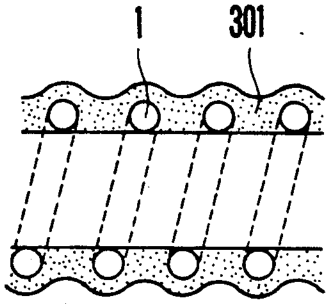
FIGS. 3(*a*) and 3(*b*) are schematic sectional diagrams showing the process steps of forming the insulating layer of the heater according to the present invention.
Figure 3B:
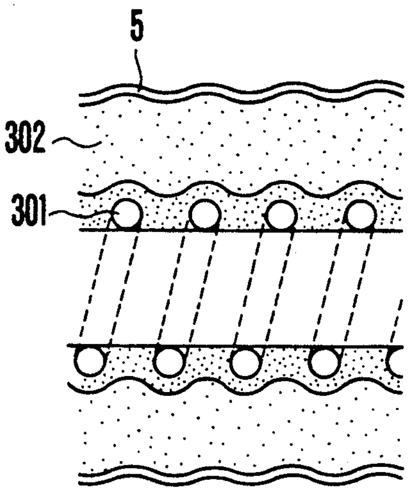

The above-mentioned metallic wire coil is immersed in said suspension and an electric current is applied between said coil used as the negative electrode and aluminum used as the positive electrode, whereby the insulating particles are uniformly filled between the metallic wires of the metallic wire coil and the first insulating layer 301 as shown in FIG. 3(*a*) is formed.

In the suspension used in forming the first insulating layer, the electrodeposition layer virtually stops growing after it has grown to a certain extent even when the time of current application is lengthened (e.g. to several minutes). This is because once electrodeposited gel precipitates on the surface of metallic wire, the hydroxide gel, which plays an important role in electrodepositing the inorganic insulating particles, closely adheres to the surface strongly, which in turn impedes the passing of electric current.

The first insulating layer 301 is satisfactory for its purpose if it is applied to an extent sufficient for approximately covering the surface of metallic wire coil as shown in FIG. 3(*a*), and does not need to be coated until the surface becomes completely flat. Rather, coating in excess of said extent is unpreferable because it causes contraction of the surface in firing and results in development of cracks.

As described above, it is not easy to form the whole of the insulating layer with the first insulating layer alone. Accordingly, it is advantageous to attain the necessary thickness of the insulating layer by the second insulating layer 302 formed on the first insulating layer 301.

In the case of a cathode ray tube cathode heating heater, the second insulating layer 302 is preferably formed in a thickness of 10 μm or more.

In attaching the second insulating layer, the first insulating layer is preferably fired in advance, but the second insulating layer can be formed also on an unfired first layer.

The suspension used in forming the second insulating layer may be those of components and compositions conventionally used.

The second layer also is preferably electrodeposited by electrophoresis or like means. However, the suspension used here is preferably an electrodeposition liquid whose electrolyte component shows an electrodeposition characteristic of diffusion-control type.

Examples of said electrolytes which show an electrodeposition characteristic of diffusion-control type include mixtures of alkali metal salts, such as $KNO_3$, or alkaline earth metal salts such as $Y_2(NO_3)_3$, $Mg(NO_3)_2$ and $Ca(NO_3)_2$ with anhydrous $Al(NO_3)_3$. Suspensions preferably used are prepared by dissolving said electrolytes in an aqueous alcohol solution and dispersing and suspending inorganic insulating particles therein.

The second insulating layer is shown schematically as the insulating layer 302 in FIG. 3(*b*).

Figure 1:
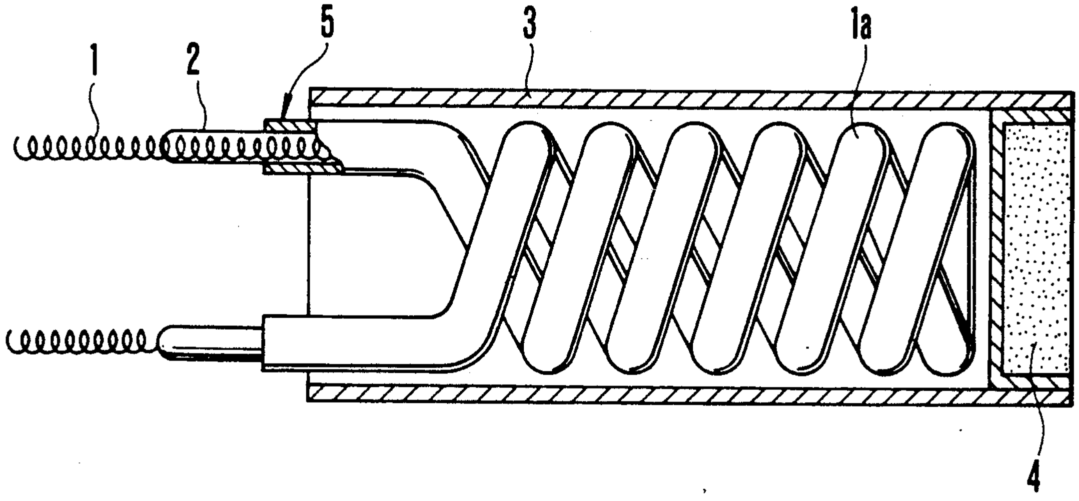
FIG. 1 is a schematic sectional diagram showing the outward appearance of a cathode ray tube cathode heating heater.
Figure 2:
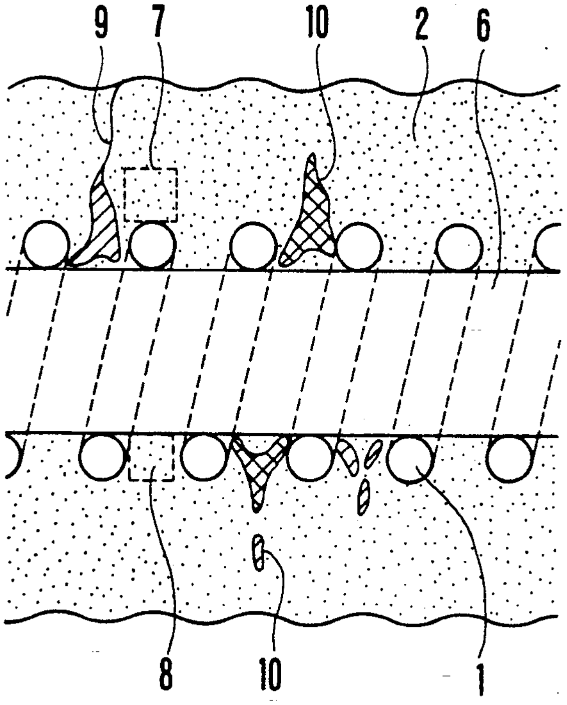
FIG.2 PRIOR ART
FIG. 2 is a schematic sectional diagram of a cathode ray tube cathode heating heater of the prior art.
Figure 5A:
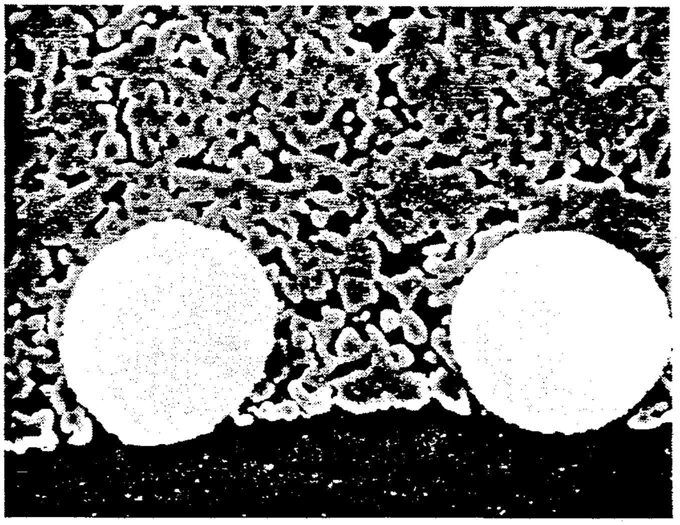
FIGS. 5(*a*) and 5(*b*) are SEM photomicrographs showing the particle structure of the inorganic insulating particle in the insulating layer of the heater of the present and a prior art heater, respectively.
Figure 5B:
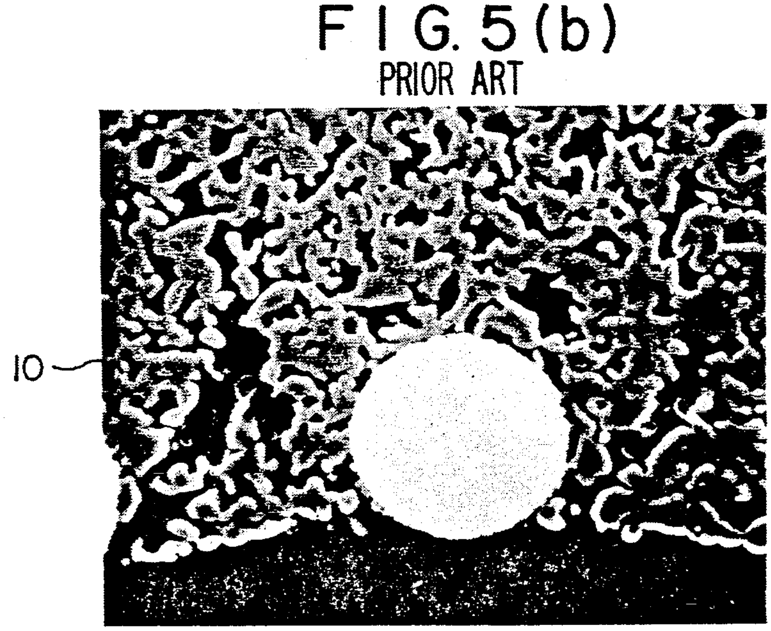
FIG. 5(b) PRIOR ART

The second insulating layer electrodeposited onto the surface of the first layer hardly develops parts of non-uniform particle packing or void parts (numerals 9 and 10, FIG. 2) as seen in the prior insulating layers [see FIG. 5(*a*)].

The first insulating layer 301 may be attached not only by electrodeposition but also by means of dip coating using a suspension of inorganic insulating particles. However, it is difficult to control the thickness of the insulating layer by the dip coating method alone. Accordingly, it is preferable to apply electrodeposition after a thin layer of the inorganic insulating particles has been attached onto the metallic wire by means of dip coating.

The second insulating layer 302 may be formed by means of dip coating, spraying etc. using said suspension. Although the control of the thickness of insulating layer is easier than for the first layer, an insulating layer of smooth surface as obtainable by electrodeposition is difficultly obtained.

The suspension used in said dip coating method etc. may be obtained, for example, by dispersing and suspending inorganic insulating particles in a proportion of 1–3 g to 1 l of a solvent comprising methyl isobutyl ketone as the main component and then adding methylcellulose or nitrocellulose thereto as a binder for the particles.

Action

The improved life of the inorganically insulated heater of the present invention is attributed first to the fact that in the first insulating layer adhered and formed between the metallic wires of the metallic wire coil, the inorganic insulating particles distribute uniformly and no void and other defects develop, so that the strength and the electric insulation characteristic of the insulating layer are improved.

It is further attributed to the fact that the above result influences also on the formation of the second insulating layer, leading to uniform particle distribution and formation of uniform insulating layer, and resultantly a heater having little of defect throughout the whole insulating layer is formed.

Particularly preferable heater according to the present invention comprises a metallic wire of 10–200 μm diameter, the spacing between the wires being about the same as the diameter of said wire and an insulating layer being provided therebetween. In particular, it is advantageously used for bright, high grade color cathode ray tubes in which the heater temperature reaches 1000° C. or more, preferably 1200° C. or more.

The insulating layer of the inorganically insulated heater according to the present invention comprises uniformly filled inorganic insulating particles. This is effective in preventing the development of cracks in the insulating layer and makes it possible to provide a heater of long life.

EXAMPLE

EXAMPLE 1

FIGS. 3(*a*) and (*b*) are each a schematic sectional diagram of the inorganically insulated heater according to the present invention. In the Figure, (a) is a schematic diagram showing the situation of the first insulating layer 301 after electrodeposition, and (b) is a schematic diagram showing the situations of the second insulating layer 302 and the dark layer 5.

The first insulating layer 301 shown in FIG. 3(*a*) was formed by electrophoresis of $Al_2O_3$ particles such that the layer is higher than the W wire by a thickness of 10 μm. Accordingly, total thickness was 60 μm.

The suspension was prepared by dissolving 132 g of anhydrous $Al(NO_3)_3$, the electrolyte component, in 8 l of aqueous ethanol solution and then adding thereto as inorganic insulating particles 4.5 kg each of two kinds of $Al_2O_3$ particles of a purity of 99.9% or more having average particle diameter of 12 μm and 4 μm, respectively.

Then $Al_2O_3$ particles were electrodeposited by means of electrophores is using the suspension prepared above. A metallic wire coil comprising W wire of 50 μm diameter wound round a Mo core of 150 μm diameter was connected to the negative side, aluminum metal was connected to the positive side, and an electric current was applied at DC 80 V for 4 seconds. The W wire was wound in the coil with a spacing approximately equal to the diameter of the W wire.

Then the electrodeposited layer was fired in hydrogen atmosphere at 1600° C. for 5 minutes to form the first insulating layer.

The suspension for the second insulation layer was prepared by dissolving 132 g of $Al(NO_3)_3$ and 126 g of $Mg(NO_3)_2.6H_2O$ in 8 l of aqueous ethanol solution and then adding thereto as the inorganic insulating particles the same $Al_2O_3$ as that used for the first insulating layer mentioned above.

The packing rate of $Al_2O_3$ particles was 67% on the average for the insulating layer of the first layer insulating part 8 (between the coil wires and up to the height of the coil) and 65% on the average for the insulating layer of the second layer insulating part 9 (on the upside of the metallic wire coil).

When the first layer alone was electrodeposited under the same conditions the particle packing rate was 61% on the average. This reveals that during the electrodeposition of the second insulating layer $Al_2O_3$ particles reentered between the $Al_2O_3$ particles of the first insulating layer and thereby increased the packing rate.

The packing rate of inorganic insulating particles was determined as follows. The inorganically insulated heater obtained was embedded in ordinary-temperature curing epoxy resin. After curing of the resin the part where the packing rate was to be determined was exposed by cutting, the exposed surface was polished, nine visual fields each were selected from the polished surface, and SEM photomicrographs were taken at a magnification of 2,000-3,000. The packing rate was determined from the area ratio in the photomicrograph by use of a picture processing-analyzing apparatus (MAGISCAN 2A, mfd. by Joyce-Loebl Co.). A diamond abrasive of an average particle diameter of 0.5μm was used for said polishing.

After the second insulating layer had been electrodeposited, the surface of the insulating layer was dip-coated with a suspension containing W particles of an average particle diameter of 1 μm and a purity of 99.9% or more dispersed and suspended therein, then fired in hydrogen atmosphere at 1600° C. for 5 minutes and at 1700° C. for 30 minutes to form a dark layer of 10 μm thickness.

After cooling, the Mo core was removed by dissolution with a liquid mixture of nitric acid and sulfuric acid, and the remaining system was washed with water and dried to obtain an in organically insulated heater.

Figure 4:
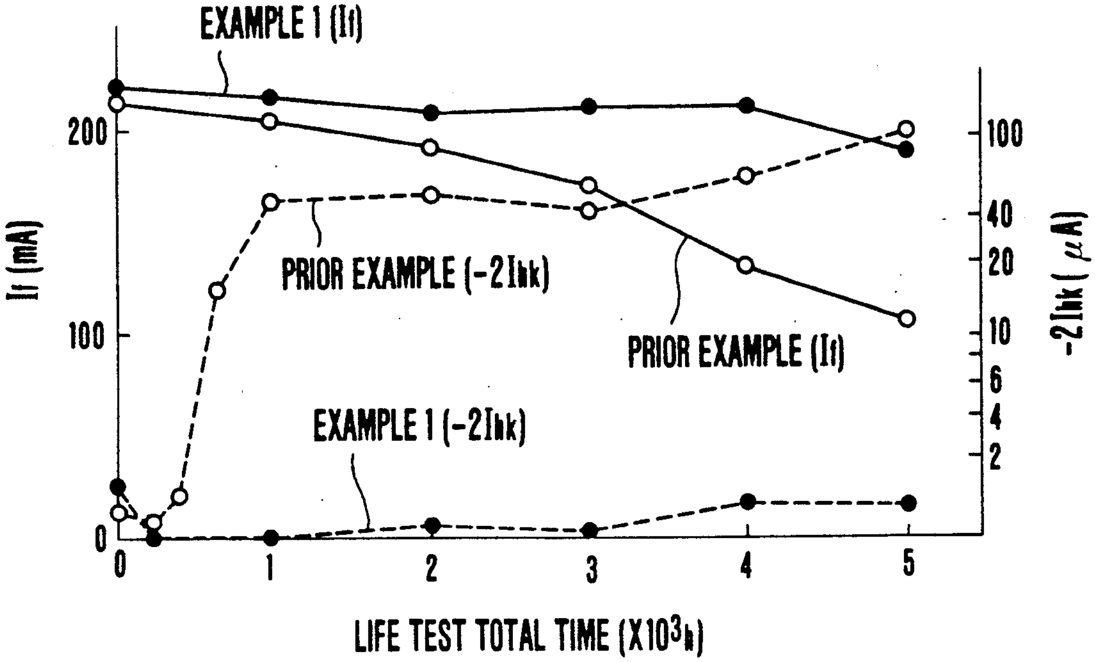
FIGS. 4 and 6 are each a graph showing the result of life test of the heater.

FIG. 4 is a graph showing the results of life test of the heater of the present invention described above and the heater of the prior art.

The life test was conducted by use of a dummy cathode ray tube which had 3 each of respective heaters built therein and of which the neck part alone had been vacuum-sealed. To the heaters built in said dummy cathode ray tube were applied an impressed voltage $E_f$ (i.e., heater voltage) of 7.6 V, which was 20% higher than the rated value (6.3 V), and a current of on (for 5 minutes)/off (for 3 minutes) was applied. Thus the heaters were subjected to thermal shock cycles of between room temperature and about 1400° C.

The reason for the heater voltage being elevated by 20% than the rated value in the above test is that the life of the heater can thereby be evaluated in a shorter period of time. In such life tests, in general, the heater current $I_f$ tends to decrease as the total time of test increases. As to the leakage current, $-2I_{hk}$, between the heater and the cathode, the smaller the $-2I_{hk}$ and the smaller the increase of $-2I_{hk}$, the better.

As to the criterion of acceptance or rejection of the heater in said life test, the heater is judged to be rejected at the time when the average value of heater current of the three heaters built in one dummy cathode ray tube becomes 95% or less relative to the initial heater current.

When the rejection rate (i.e., number of rejected dummy tubes/number of tested tubes) is 1% or less at the 5000th cycle in said current application cycles, the heater is judged as usable in practice as a commercial product.

Table 1 shows the results thus obtained.

As is apparent from Table 1, the prior heater shows a rejection rate of 0.2% after 1,000 hours of test and a rejection rate of 1.4% after 5,000 hours, whereas the heater of the present invention shows a rejection rate of 0.1%, namely about ½ of the rate of the prior heater, after 1,000 hours and a rejection rate of about ⅓ of that of the prior heater after 5,000 hours. Thus, it is of a long life and can be satisfactorily used as a commercial product.

FIG. 4 is a graph showing the results of life test conducted with a heater wherein the average particle packing rate of the whole insulating layer was 60%.

In the Figure, the abscissa indicates the total time of life test, the left ordinate indicates the heater current $I_f$, and the right ordinate indicates the leakage current $-2I_{hk}$ between the cathode sleeve and the heater.

The heater of this Example is excellent as compared with the prior art heater in both $I_f$ and $-2I_{hk}$.

TABLE 1

| | | | Example 1 | Example 2 | Example 3 |
|---|---|---|---|---|---|
| First layer | | | | | |
| Electrolyte | Anhydrous $Al(NO_3)_3$ | | 132 g | 189 g | 132 g |
| | $Al(NO_3)_3.9H_2O$ | | — | 37 g | — |
| Insulating film | $Al_2O_3$ | Average particle diameter 12 μm | 4.5 kg | — | 8.1 kg |
| | | Average particle diameter 4 μm | 4.5 kg | 9 kg | 0.1 kg |
| Dispersant | Aq. ethanol solution | | 8 l | 8 l | 8 l |
| Electrodeposition | | | DC 80 V, 4 Sec. | DC 80 V, 4 Sec. | DC 80 V, 5 Sec. |
| Sintering | | | In hydrogen gas 1600° C., 5 Min. | In hydrogen gas 1600° C., 5 Min. | In hydrogen gas 1600° C., 5 Min. |
| Second layer | | | | | |
| Electrolyte | Anhydrous $Al(NO_3)_3$ | | 132 g | 132 g | 132 g |
| | $Mg(NO_3)_2.6H_2O$ | | 126 g | 126 g | 126 g |
| Insulating film | $Al_2O_3$ | Average particle diameter 12 μm | 4.5 kg | — | — |
| | | Average particle diameter 4 μm | 4.5 kg | 3 kg | 3 kg |
| | | Average particle diameter 2 μm | — | 3 kg | 3 kg |

TABLE 1-continued

| | | | Example 1 | Example 2 | Example 3 |
|---|---|---|---|---|---|
| Dispersant | Aq. ethanol solution | | 8 l | 8 l | 8 l |
| Electrodeposition | | | DC 80 V, 4 Sec. | DC 80 V, 4 Sec. | DC 80 V, 4 Sec. |
| Sintering | (Sintered after dark layer formation) | | — | — | — |
| Dark layer | | | | | |
| | Tungsten (W) | Average particle diameter 1 μm | thickness 10 μm | thickness 10 μm | thickness 10 μm |
| Sintering | (Sintered simultaneously with second layer) | | In hydrogen gas 1600° C., 5 Min. 1700° C., 30 Min. | In hydrogen gas 1600° C., 5 Min. 1700° C., 30 Min. | In hydrogen gas 1600° C., 5 Min. 1700° C., 5 Min. |

TABLE 2

| Life test, total time (h) | 400 | 500 | 600 | 1000 | 2000 | 4000 |
|---|---|---|---|---|---|---|
| Number of on/off cycles | 3000 | 3750 | 4500 | 7500 | 15000 | 30000 |
| Rejection rate (%) | | | | | | |
| Present heater | 0.13 | 0.31 | 0.34 | 0.55 | 0.72 | 0.85 |
| Prior heater | 0.24 | 1.15 | 2.5 | 5.4 | 10.2 | 20.4 |
| Breaking of wire | | | | | | |
| Present heater | None | None | None | None | Present | Present |
| Prior heater | None | Present | Present | Present | Present | Present |

The compositions of respective suspensions used for forming the first and the second insulating layers and the dark layer, as well as the conditions of forming and sintering said layers are shown in Table 1 together with those for Examples 2 and 3 described later. The properties of the inorganically insulated heaters obtained are shown in Table 2.

FIGS. 5(*a*) and 5(*b*) are SEM photomicrograph at a magnification of 600 showing the particle structure of an insulating layer.

As can be seen from FIG. 5(*a*), the inorganic insulating particles of the first insulating layer according to the present invention are formed approximately uniformly, and virtually no void part 10 as observed in FIG. 5(*b*) is recognized.

EXAMPLE 2

A cathode heating heater was prepared in the same manner as in Example 1.

The first insulating layer was formed by means of electrophoresis. The composition of the suspension and the conditions of electrodeposition and sintering are shown in Table 1.

As the electrolyte components were used anhydrous $Al(NO_3)_3$ in combination with $Al(NO_3)_3.9H_2O$. The reason for this is as follows.

When $Al(NO_3)_3$ $.9H_2O$ alone is used and the first insulating layer having excellent adhesiveness has once been formed, the insulating layer difficultly grows thereafter even when electricity is applied for a long time. When anhydrous $Al(NO_3)_3$is added to the suspension, however, an insulating layer having a predetermined thickness can be formed easily.

The first insulating layer had a thickness of about 10 μm above the metallic wire coil and about 40μ between the metallic wires. After the layer had been sintered the second insulating layer was formed by electrodeposition.

The $Al_2O_3$ particle packing rate of the first insulating layer was 70% on the average and that of the second insulating layer was 74% on the average.

When the first insulating layer alone was electrodeposited under the same conditions the particle packing rate was 65% on the average. This reveals that, similarly to the case of Example 1, $Al_2O_3$ particles reentered the interstices between the particles of the first insulating layer during the electrodeposition of the second insulating layer.

The dark layer was also formed in the same manner as in Example 1.

Figure 6:
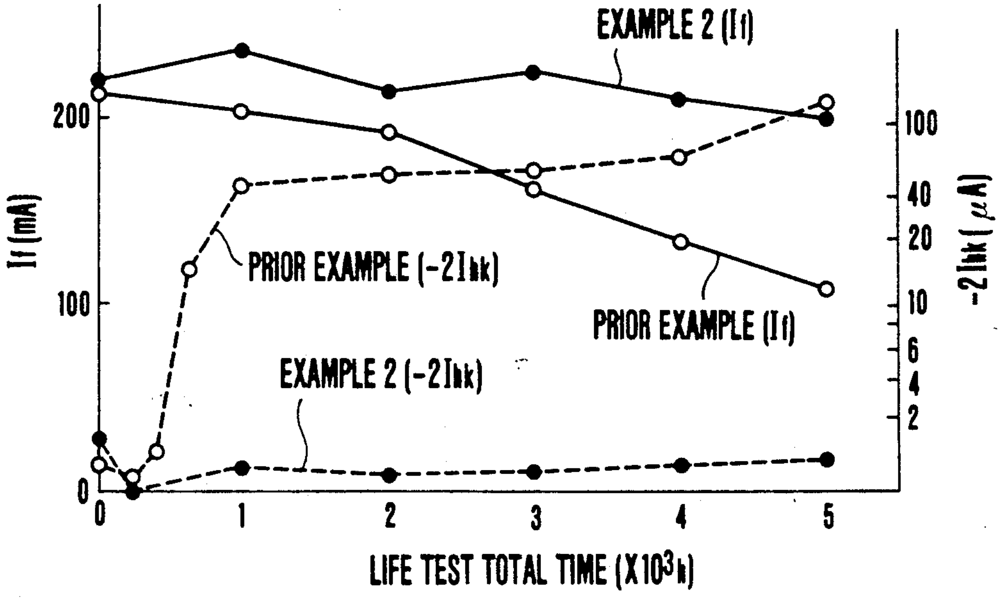

FIG. 6 shows the results of life test conducted for the heater of the present Example and the heater of the prior art.

Similarly to the heater of Example 1 the heater of the present invention shows excellent performances as compared with the prior art heater.

EXAMPLE 3

A cathode heating heater was prepared in the same manner as in Example 1.

The $Al_2O_3$ particle packing rate of the first insulating layer was 70% on the average and that of the second insulating layer was 72% on the average. When the first insulating alone was electrodeposited the $Al_2O_3$ particle packing rate was 65% on the average. This reveals that, as in Examples 1 and 2, $Al_2O_3$ particles reentered the first insulating layer during the electrodeposition of the second insulating layer.

In the present Example, $Al_2O_3$ particles of relatively large particle diameter (about 12 μm) were electrodeposited as the first insulating layer, and those of relatively small particle diameter (about 3 μm) were electrodeposited to the outside thereof as the second insulating layer.

As the result, sintering of particles that proceeds during the operation of the heater is suppressed by the presence of particles of large diameter. This is effective in relieving the contraction of the insulating layer but, since the firing of the first insulating layer proceeds with difficulty, its strength is apt to be unsatisfactory This loss in strength, however, can be compensated for by coating particles of relatively small diameters as the second insulating layer.

After the electrodeposition of the second insulating layer, the dark layer was coated and fired in hydrogen atmosphere. Thus, a heater according to the present invention was prepared.

Table 3 shows the results of the life test of the heater.

TABLE 3

| Life test. total time (h) | 400 | 500 | 600 | 1000 | 2000 | 4000 |
|---|---|---|---|---|---|---|
| Number of on/off cycles | 3000 | 3750 | 4500 | 7500 | 15000 | 30000 |
| Rejection rate (%) | | | | | | |
| Present heater | 0.10 | 0.29 | 0.33 | 0.48 | 0.69 | 0.77 |
| Prior heater | 0.24 | 1.15 | 2.5 | 5.4 | 10.2 | 20.4 |
| Breaking of wire | | | | | | |
| Present heater | None | None | None | None | None | Present |
| Prior heater | None | Present | Present | Present | Present | Present |

The cathode for the cathode ray tube of the present invention is prepared by inserting and fixing said heater in the cathode sleeve and providing a cathode pellet at the end of the cathode sleeve.

EXAMPLE 4

Figure 7:
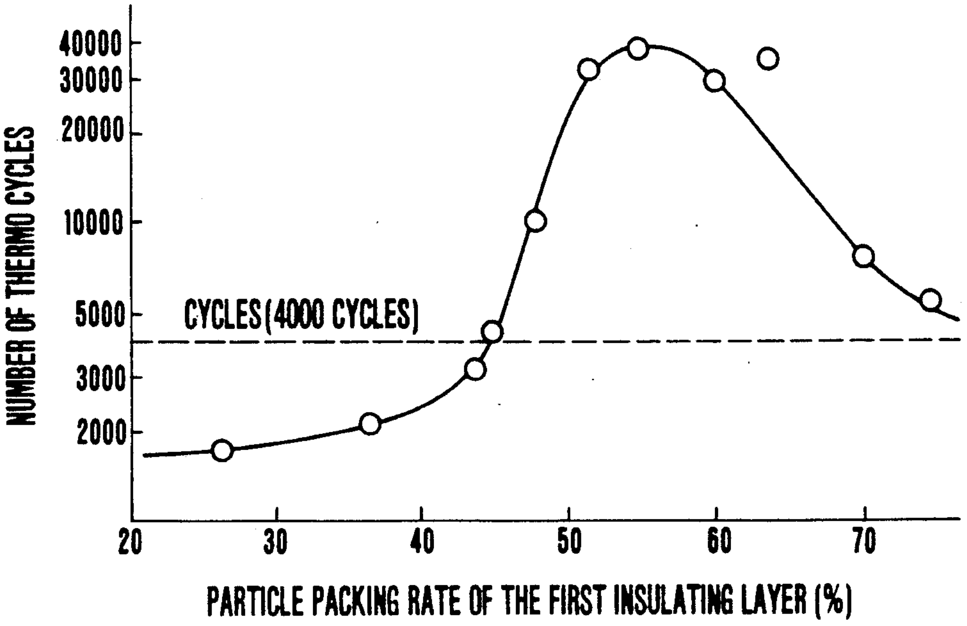
FIG. 7 is a graph showing the relationship between the packing rate of the inorganic insulating particles in the first insulating layer of the inorganically insulated heater and the lift of the heater.

FIG. 7 is a graph showing the relationship between the packing rate of the inorganic insulating particles of the first insulating layer of Example 1 and the life of the heater.

Inorganically insulated heaters were prepared in the same manner as in Example 1 but with varied particle packing rates of the first insulating layer. The heaters were subjected to current application test of on (5 minutes)/off (3 minutes) cycles to compare the life time of the heaters which elapsed until the breaking of wire of the heaters.

As is apparent from the Figure, the life improves rapidly as the packing rate of the inorganic insulating particles exceeds 40%. A packing rate in the range of 45–75% is preferable since it gives a life of 4,000 cycles or more. Particularly, when the packing rate is in the range of 50–65%, the heater shows an outstanding life of 20,000 cycles or more.

Figure 8:
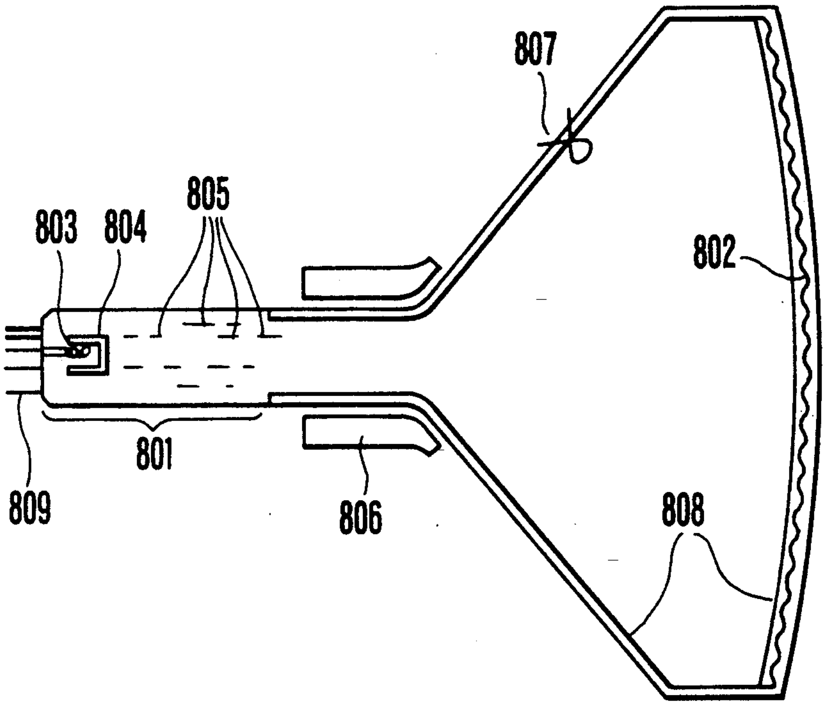
FIG. 8 is a schematic sectional diagram of the overall structure of a cathode ray tube using the heater of the present invention.

FIG. 8 shows a section of a cathode ray tube.

The cathode ray tube comprises a funnel-formed glass tube and, sealed in the tube, an electric gun 801 and a fluorescent screen 802. The glass tube is composed of a bulgy cone part and a slender cylindrical neck part, the bottom of the cone part being coated with a fluorescent material (i.e., a substance which emits fluorescence on electron beam eradiation), and is sealed under a high vacuum.

The electron gun 801 is composed of a cathode 804 which emits electrons when heated with a cathode heating heater 803 and a cylindrical electrode (i.e., grid) which collects the flux of the electrons into an electron beam, accelerates the beam to a high speed and simultaneously converges it on the fluorescent screen.

The cathode tube is provided with a deflecting yoke 806 socket pins 809 and an anode button 807. An electroconductive film 808 (i.e., aluminum film covering the fluorescent screen 802) is formed on the inner surface of the neck part and the cone part.

The use of the cathode heating heater of the present invention in the cathode ray tube mentioned above enables improving the life of the cathode ray tube.

EXAMPLE 5

Figure 9:
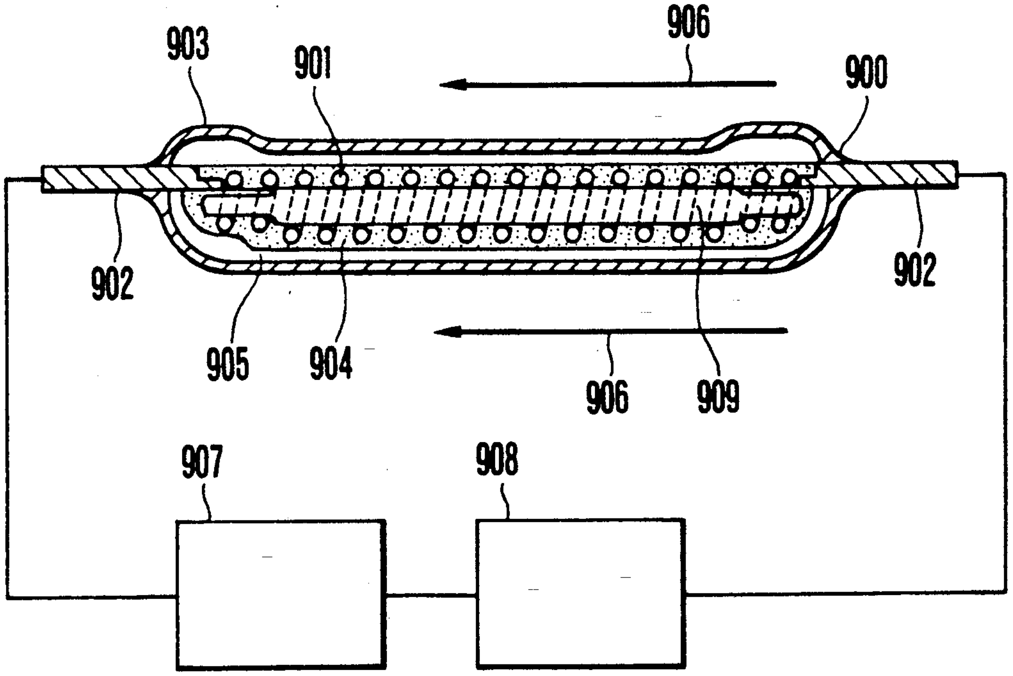
FIG. 9 is a diagram showing the structure of an air flow sensor using the heater of the present invention.

FIG. 9 shows the structure of an air flow sensor for use in automobiles.

In an inorganically insulated heater 900 is formed a platinum wire coil 901 of a wire diameter of 30 μm. To the both ends thereof are attached lead wires 902 of a diameter of 120 μm formed of Pt—Ir, and are connected through a microammeter 907 to a voltage impressing apparatus 908.

Between the adjacent coils of said platinum wire coil 901, is formed by the same method as in Example 2 the first insulating layer 904, and further thereon the second insulating layer 905 around space 909.

The packing rate of the inorganic insulating particles of the first insulating layer 904 is 55% on the average, and the packing rate of the second insulating layer is 62% on the average. A glass protective layer 903 about 50 μm in thickness is further formed on said second insulating layer.

The inorganically insulated heater part 900 is provided in a carburetor (not shown in the Figure) of an automobile. It detects the change of heat caused by a gas stream 906 flowing through the carburetor as a change of minute electric current, finds the flow rate of said gas stream based on the detected signal, and controls the flow rate of air charged into the cylinder of an engine to a proper value.

The use of the inorganically insulated heater of the present invention enables improving the vibration resistance and the life of an air flow sensor.

We claim:

1. An inorganically insulated heater comprising:
   - a metallic wire heater coiled about a hollow core;
   - a composite insulating layer extending outwardly from said hollow core and covering an outer peripheral surface of said metallic wire heater other than a surface facing said hollow core; and
   - a covering layer provided on an outer surface of said composite insulating layer; wherein said composite insulating layer comprises:
   - a first insulating layer provided in close contact with said metallic wire heater and extending outwardly from said hollow core to a thickness sufficient to cover said outer peripheral surface of said metallic wire heater, said first insulating layer being made of a porous inorganic substance and having a packing rate of inorganic particles in a region extending from said hollow core to a level corresponding to a diameter of said metallic wire and between adjacent coils of said metallic wire heater of 45–75% as expressed in terms of ratio to a sectional area of said composite insulating layer; and
   - a second insulating layer provided on an outer surface of said first insulating layer, said second insulating layer being made of a porous inorganic substance and having a packing rate of inorganic particles approximately equal to or higher than that of said first insulating layer.

2. An inorganically insulated heater according to claim 1, wherein said packing rate of said second insulating layer is 45 to 85%.

3. An inorganically insulated heater according to claim 1, wherein said packing rate of said first insulating layer in said region is 50 to 65% and said packing rate of said second insulating layer is 60 to 75%.

4. An inorganically insulated heater according to claim 1, wherein said first insulating layer consists essentially of alumina and said second insulating layer comprises alumina and a small amount of at least one material selected from the group consisting of alkali metal oxide and alkaline earth metal oxides.

5. An inorganically insulated heater according to claim 1, wherein said first insulating layer is formed from reaction-control type electrolyte and said second insulating layer is formed from diffusion-control type electrolyte.

6. An air flow sensor provided with an inorganically insulated heater arranged in a gas stream whose flow rate is to be detected, a means of heating by application of electric current for heating the heater, and a detecting means for detecting a temperature of the heater which changes with a change in flow rate of the gas stream, wherein said inorganically insulated heater comprises:

a metallic wire heater coiled about a hollow core;

a composite insulating layer extending outwardly from said hollow core and covering an outer peripheral surface of said metallic wire heater other than a surface facing said hollow core; and a covering layer provided on an outer surface of said composite insulating layer; wherein said composite insulating layer comprises:

a first insulating layer provided in close contact with said metallic wire heater and extending outwardly from said hollow core to a thickness sufficient to cover said outer peripheral surface of said metallic wire heater, said first insulating layer being made of a porous inorganic substance and having a packing rate of inorganic particles in a region extending from said hollow core to a level corresponding to a diameter of said metallic wire and between adjacent coils of said metallic wire heater of 45–75% as expressed in terms of ratio to a sectional area of said composite insulating layer; and a second insulating layer provided on an outer surface of said first insulating layer, said second insulating layer being made of a porous inorganic substance and having a packing rate of inorganic particles approximately equal to or higher than that of said first insulating layer.

7. An air flow sensor according to claim 6, wherein said packing rate of said second insulating layer is 45 to 85%.

8. An air flow sensor according to claim 6, wherein said packing rate of said first insulating layer in said region is 50 to 65% and said packing rate of said second insulating layer if 60 to 75%.

9. A cathode ray tube cathode heating heater for heating a cathode ray-emitting cathode pellet of a cathode ray tube comprising:

a metallic wire heater coiled about a hollow core;

a composite insulating layer extending outwardly from said hollow core and covering an outer peripheral surface of said metallic wire heater other than a surface facing said hollow core; and a covering layer provided on an outer surface of said composite insulating layer; wherein said composite insulating layer comprises:

a first insulating layer provided in close contact with said metallic wire heater and extending outwardly from said hollow core to a thickness sufficient to cover said outer peripheral surface of said metallic wire heater, said first insulating layer being made of a porous inorganic substance and having a packing rate of inorganic particles in a region extending from said hollow core to a level corresponding to a diameter of said metallic wire and between adjacent coils of said metallic wire heater of 45–75% as expressed in terms of ratio to a sectional area of said composite insulating layer; and a second insulating layer provided on an outer surface of said first insulating layer, said second insulating layer being made of a porous inorganic substance and having a packing rate of inorganic particles approximately equal to or higher than that of said first insulating layer.

10. A cathode ray tube cathode heating heater according to claim 9, wherein said packing rate of said second insulating layer is 45 to 85%.

11. A cathode ray tube cathode heating heater according to claim 9, wherein said packing rate of said first insulating layer in said region is 50 to 65% and said packing rate of said second insulating layer is 60 to 75%.

12. A cathode ray tube cathode heating heater according to claim 9, wherein said composite insulating layer has an electric insulating property which undergoes substantially no deterioration after subjected to 4,000 thermal cycles between room temperature and 1,400° C.

13. A cathode ray tube cathode heating heater according to claim 12, wherein said packing rate of said second insulating layer is 45 to 85%.

14. A cathode ray tube cathode heating heater according to claim 12, wherein said packing rate of said first insulating layer in said region is 50 to 65% and said packing rate of said second insulating layer is 60 to 75%.

15. A cathode ray tube cathode heating heater according to claim 9, wherein said composite insulating layer has an electric insulating property such that no imperfect insulation occurs in an electric current application test of 4,000 on-off cycles as a voltage applied to said metallic wire heater of 6.3 V or more and a potential difference between the cathode ray-emitting pellet and the metallic wire heater of 400 V.

16. A cathode ray tube cathode heating heater according to claim 15, wherein said packing rate of said second insulating layer is 45 to 85%.

17. A cathode ray tube cathode heating heater according to claim 15, wherein said packing rate of said first insulating layer in said region is 50 to 65% and said packing rate of said second insulating layer is 60 to 75%.

18. A cathode ray tube cathode provided with a cathode sleeve and a cathode pellet arranged at an end of said cathode sleeve and a cathode pellet heating heater fitted in said cathode sleeve, said cathode pellet heating heater comprising:

a metallic wire heater coiled about a hollow core and shaped in the form of a double coil;

a composite insulating layer extending outwardly from said hollow core and covering an outer peripheral surface of said metallic wire heater other than a surface facing said hollow core; and a covering layer provided on an outer surface of said composite insulating layer; wherein said composite insulating layer comprises:

a first insulating layer provided in close contact with said metallic wire heater and extending outwardly from said hollow core to a thickness sufficient to cover said outer peripheral surface of said metallic wire heater, said first insulating layer being made of a porous inorganic substance uniformly filled with inorganic insulating particles and having a packing rate of said inorganic insulating particles in a region extending from said hollow core to a level corresponding to a diameter of said metallic wire and between adjacent coils of said metallic wire heater of 45-75% as expressed in terms of ratio to a sectional area of said composite insulating layer; and a second insulating layer provided on an outer surface of said first insulating layer, said second insulating layer being made of a porous inorganic substance and having a packing rate of inorganic particles approximately equal to or at most 10% or more than that of said first insulating layer.

19. A cathode ray tube cathode according to claim 18, wherein said packing rate of said second insulating layer is 45 to 85%.

20. A cathode ray tube cathode according to claim 18, wherein said packing rate of said first insulating layer in said region is 50 to 65% and said packing rate of said second insulating layer is 60 to 75%.

21. A cathode ray tube cathode provided with a fluorescent screen and a cathode ray gun having a grid cathode arranged to oppose said fluorescent screen, the cathode ray gun being provided with a cathode sleeve, a cathode pellet arranged at an end of said cathode sleeve and a cathode heating heater fitted in said cathode sleeve, said cathode heating heater comprising:

a metallic wire heater coiled about a hollow core and shaped in the form of a double coil;

a composite insulating layer extending outwardly from said hollow core and covering an outer peripheral surface of said metallic wire heater other than a surface facing said hollow core; and a covering layer provided on an outer surface of said composite insulating layer; wherein said composite insulating layer comprises:

a first insulating layer provided in close contact with said metallic wire heater and extending outwardly from said hollow core to a thickness sufficient to cover said outer peripheral surface of said metallic wire heater, said first insulating layer being made of a porous inorganic substance uniformly filled with inorganic insulating particles and having a packing rate of said inorganic insulating particles in a region extending from said hollow core to a level corresponding to a diameter of said metallic wire and between adjacent coils of said metallic wire heater of 45-75% as expressed in terms of ratio to a sectional area of said composite insulating layer; and a second insulating layer provided on an outer surface of said first insulating layer, said second insulating layer being made of a porous inorganic substance and having a packing rate of inorganic particles higher by at most 10% than that of said first insulating layer.

22. A cathode ray tube according to claim 21, wherein said packing rate of said first insulating layer in said region is 50 to 65%.

* * * * *